United States Patent
Grevers, Jr.

(10) Patent No.: US 9,407,448 B2
(45) Date of Patent: Aug. 2, 2016

(54) NOTIFICATION OF AUDIO STATE BETWEEN ENDPOINT DEVICES

(71) Applicant: CISCO TECHNOLOGY, INC., San Jose, CA (US)

(72) Inventor: Theodore Grevers, Jr., Milford, MA (US)

(73) Assignee: Cisco Technology, Inc., San Jose, CA (US)

(*) Notice: Subject to any disclaimer, the term of this patent is extended or adjusted under 35 U.S.C. 154(b) by 130 days.

(21) Appl. No.: 14/082,064

(22) Filed: Nov. 15, 2013

(65) Prior Publication Data

US 2015/0139043 A1     May 21, 2015

(51) Int. Cl.
*H04L 12/16*     (2006.01)
*H04L 12/18*     (2006.01)

(52) U.S. Cl.
CPC ........ *H04L 12/1822* (2013.01); *H04L 12/1827* (2013.01)

(58) Field of Classification Search
None
See application file for complete search history.

(56) References Cited

U.S. PATENT DOCUMENTS

| | | | |
|---|---|---|---|
| 8,019,078 B2 | 9/2011 | Chavez et al. | |
| 2003/0059020 A1* | 3/2003 | Meyerson | H04L 12/58 379/219 |
| 2003/0185371 A1* | 10/2003 | Dobler | H04M 1/247 379/207.02 |
| 2009/0022305 A1 | 1/2009 | Chavez et al. | |
| 2013/0029649 A1 | 1/2013 | Hanson et al. | |

* cited by examiner

*Primary Examiner* — Kouroush Mohebbi
(74) *Attorney, Agent, or Firm* — Cindy Kaplan

(57) ABSTRACT

In one embodiment, a method includes receiving at a server in communication with a plurality of user devices, a notification of a mute state change at a first of the user devices, and generating an indication of mute state change for display at a second of the user devices. The server is used in a web session and one of the first and second user devices is used in an audio session of a conference. An apparatus and logic are also disclosed herein.

16 Claims, 4 Drawing Sheets

NOTIFICATION OF AUDIO STATE BETWEEN ENDPOINT DEVICES

TECHNICAL FIELD

The present disclosure relates generally to communication systems, and more particularly to notification of audio state.

BACKGROUND

Teleconferencing has become increasingly popular as a means to reduce travel expense and enhance collaboration between people from distributed geographic locations. Users may participate in sessions that utilize both a web browser session and a telephone session via multiple types of endpoint devices. During a teleconference, a user, host, or moderator may mute one or more of the participants. Due to the different devices and sessions, a participant may not realize that their line is muted or think that their line is muted when it is not. This may result in participants talking while they are on mute and not being heard by others, or participants thinking that they cannot be heard, when in fact, their voice is being transmitted over the teleconference.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
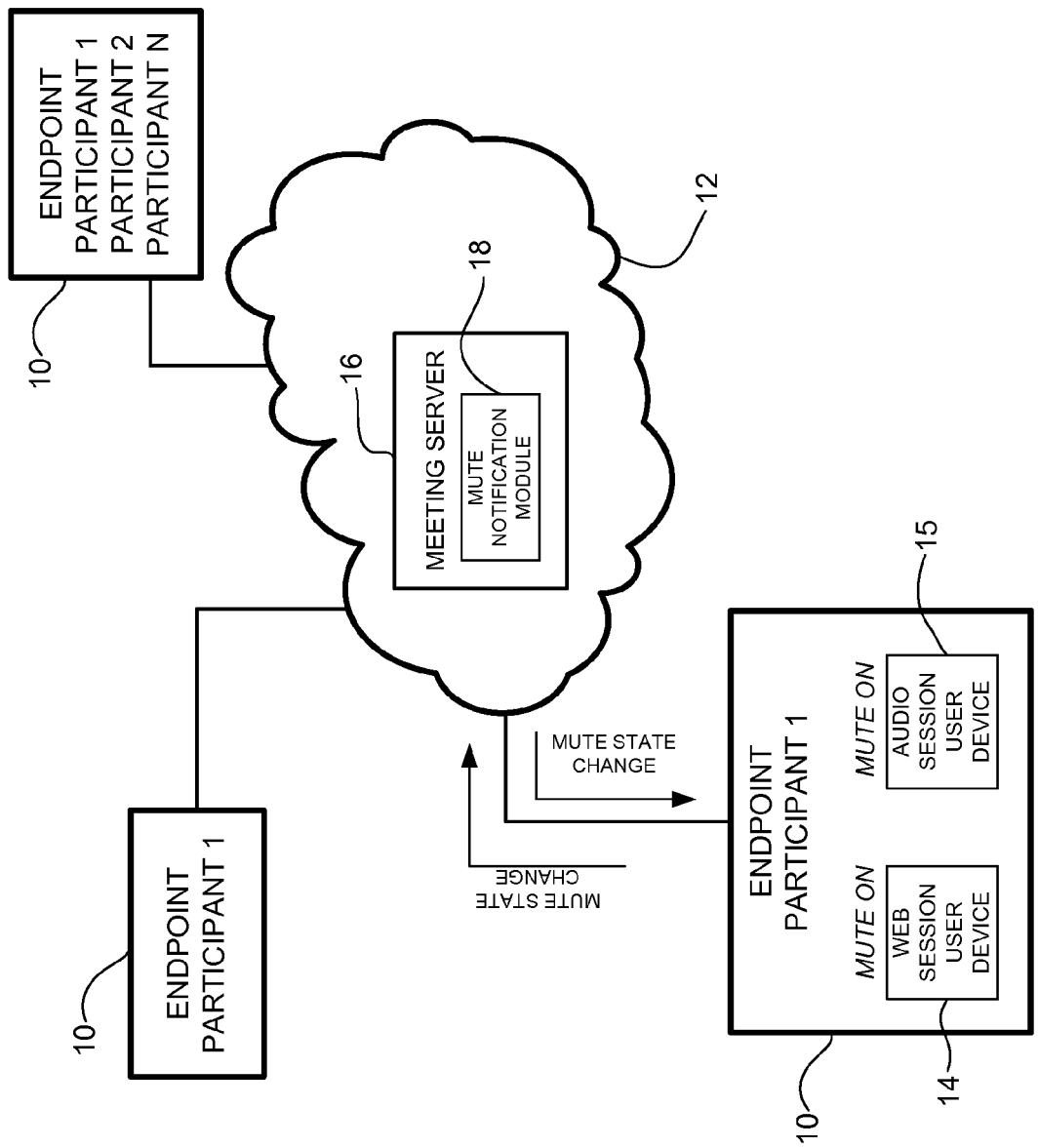
FIG. 1 illustrates an example of a network in which embodiments described herein may be implemented.

In one embodiment, a method generally comprises receiving at a server in communication with a plurality of user devices, notification of a mute state change at a first of the user devices, and generating an indication of mute state change for display at a second of the user devices. The server is used in a web session and one of the first and second user devices is used in an audio session of a conference.

In another embodiment, an apparatus generally comprises a processor operable to communicate with a plurality of user devices, receive notification of a mute state change at a first user device, and generate an indication of the mute state change for display at a second user device. The apparatus further comprises memory for storing a mute state. The server is used in a web session and one of the first and second user devices is used in an audio session of a conference.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Users may participate in a meeting session that utilizes both a web browser session and a telephone session, via multiple types of IP (Internet Protocol) connected endpoint devices. A user, host, or moderator of the session may have the ability to mute a participant or all non-speaking participants. In one example, a user may mute their own audio through a browser based button (e.g., via meeting desktop application browser session). The mute state may be indicated, for example, by a red X adjacent to the user's ID in the web session. In another example, the user may press a mute button on a keypad of their phone. The mute state may be shown at the user's phone via a red light, for example. In yet another example, a user may press a button or series of buttons on the phone's keypad, which initiates a mute of the user's audio via the web session and may be indicated by a red X adjacent to the user's ID in the web session.

In the above examples, the muted client state is not communicated between dissimilar endpoint devices (e.g., endpoints used for web browser session and endpoints used for telephone session). The mute indication is only shown on the endpoint (platform) on which the mute action was initiated. This may result in the user not realizing that their line has been muted or incorrectly thinking that their line is muted.

The embodiments described herein provide notification between dissimilar endpoint devices (platforms) to bring awareness to a user of the mute state of an audio connection. The embodiments provide mute state notification as well as capability within management devices such as a meeting server, video communications server, or communications manager for inter-platform client state communications, thereby allowing for a collaborative approach between systems.

The term 'conference' as used herein refers to any type of meeting, teleconference, video conference, audio conference, web conference, or any other communication session between a plurality of users transmitted using any audio means, including signals, data, or messages transmitted through voice or voice and video devices. Audio, video, data, or any combination thereof (e.g., multimedia) may be transmitted in the conference. The media may be encrypted, compressed, or encoded according to any format. The conference may include a web session and an audio (or audio and video) session.

The embodiments operate in the context of a data communications network including multiple network devices (nodes). Some of the devices in the network may be call managers, communications managers, service points, endpoints, media sources, media receivers, media processing units, media experience engines, multimedia transformation units, multipoint conferencing units, codecs, appliances, switches, routers, gateways, servers, or other network devices.

Referring now to the drawings, and first to FIG. 1, an example of a network in which embodiments described herein may be implemented is shown. A plurality of endpoints (e.g., media sources/receivers) 10 are in communication via network 12. The network 12 may include one or more networks (e.g., local area network, wireless local area network, radio access network, public switched network, virtual local area network, virtual private network, metropolitan area network, wide area network, enterprise network, Internet, intranet, or any other network). The nodes 10 are connected via communication links. Media flow paths between the endpoints 10 may include any number or type of intermediate nodes, which facilitate passage of data between the nodes.

The endpoints 10 are configured to originate or terminate communications over the network 12. The endpoints 10 may be any device or combination of devices configured for receiving, transmitting, or receiving and transmitting media. For example, the endpoint 10 may be a media center device (e.g., Cisco TelePresence device), mobile device (e.g., phone, personal digital assistant, smartphone, tablet, laptop computer), desktop computer, IP telephone, or any other device capable of engaging in audio, video, or data exchanges within the network 12. There may be one or more participants (users) located at or associated with each endpoint 10 (e.g., participant 1 . . . N as shown in FIG. 1). As described below, each participant (or group of participants) may utilize one or more user (client) devices in the conference (e.g., computer 14 for web session and phone 15 for audio session).

Included in the data path between the endpoints 10 is a meeting server 16. The meeting server 16 may be, for example, a Cisco WebEx Meetings Server, available from Cisco Systems, Inc. of San Jose, Calif., or any other server or network device operable to perform meeting functions. The meeting server 16 may be located at a network 12 separate from the endpoints 10 (as shown in FIG. 1) or a network containing one or more of the endpoints. The meeting server 16 may also be a virtual appliance in a private or public cloud, for example.

In the example shown in FIG. 1, a mute notification module 18 is located at the meeting server 16. The mute notification module 18 may be installed, for example, at a communications server (e.g., XMPP (Extensible Messaging and Presence Protocol) server), which may be located at the meeting server 16 (as shown in FIG. 1) or at a separate network device in communication with the meeting server. As described in detail below, the mute notification module 18 is operable to notify dissimilar platforms of a change in mute state, to provide awareness of the mute state of the audio connection. For example, the meeting server 16 may receive notification that a client has muted their audio via the web session and announce the mute state change to any user device that has a client ID matching that of the user that has muted their audio. In another example, the server 16 may receive notification that a user has muted their audio via a phone and update their mute state in the meeting application browser.

The meeting server 16 is aware of any users that have muted their audio session through a client application interface with the meeting server. For example, the client may use the client application interface to select a mute button adjacent to their user ID. The meeting server 16 mutes the caller's audio via the meeting server audio bridge. In order to notify other endpoint devices (e.g., audio devices not associated with the web session), the mute state is communicated to any connected client devices associated with the user's ID. In one example, the XMPP server is used to communicate the mute state change from the meeting server to the client device.

The meeting server 16 may communicate the mute state change directly to the endpoint device or to a network device interposed between the endpoint and meeting server (e.g., communications manager, video communications server), as described below. For example, the XMPP server may communicate directly with an XMPP client created within the communications manager, video communications server, client device, or any other network device.

It is to be understood that the network shown in FIG. 1 and described above is only an example and that the embodiments described herein may be implemented in networks having different network topologies and network devices, without departing from the scope of the embodiments.

Figure 2:
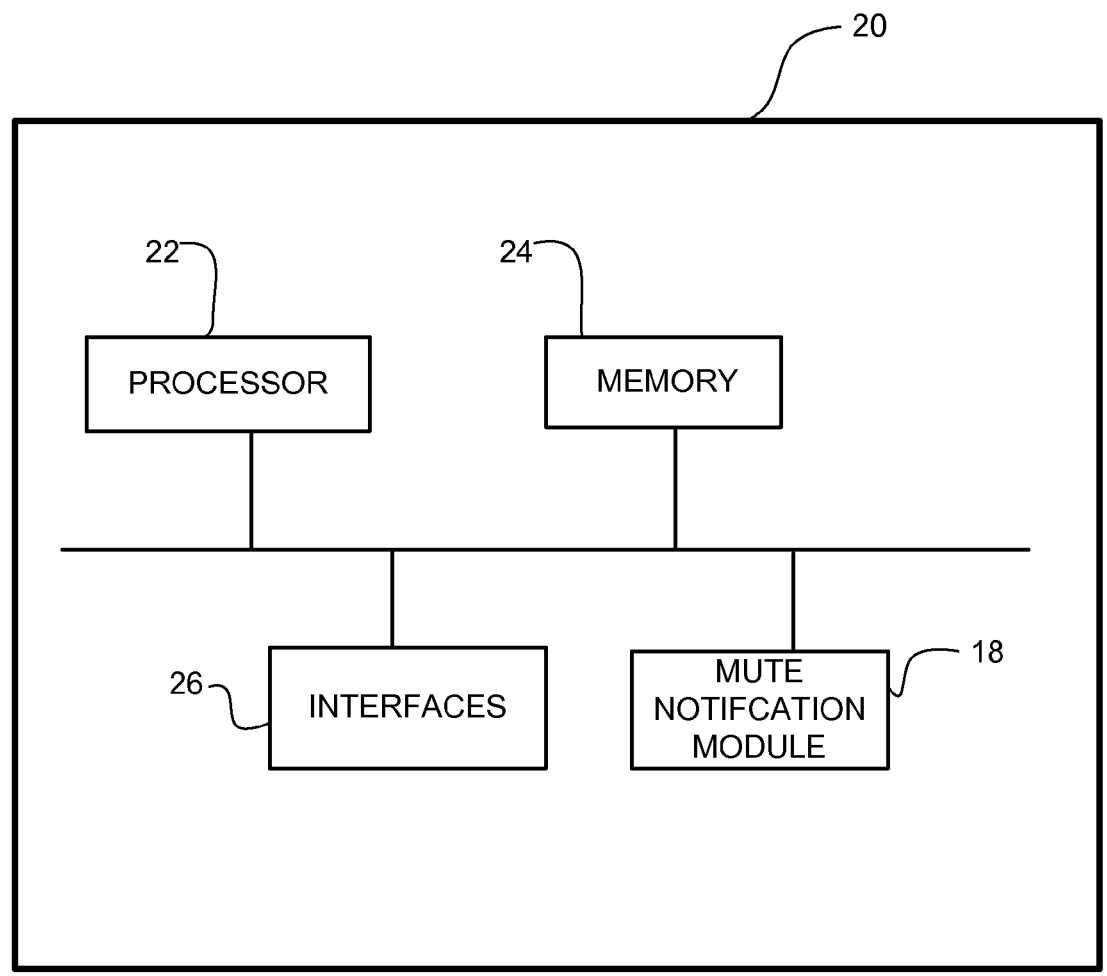
FIG. 2 depicts an example of a network device useful in implementing embodiments described herein.

FIG. 2 is a block diagram illustrating an example of a network device 20 (e.g., meeting server 16 in FIG. 1 or other network device) that may be used to implement embodiments described herein. The network device 20 is a programmable machine that may be implemented in hardware, software, or any combination thereof. The network device 20 includes a processor 22, memory 24, interfaces 26, and mute notification module 18.

Memory 24 may be a volatile memory or non-volatile storage, which stores various applications, modules, and data for execution and use by the processor 22.

The mute notification module 18 may comprise software or any other mechanism operable to perform the functions described herein. For example, the mute notification module may comprise logic stored in memory 24.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 26 may comprise any number of interfaces (linecards, ports) for receiving data or transmitting data to other devices.

The network device 20 may further include any suitable combination of hardware, software, algorithms, processors, devices, components, or elements operable to facilitate the capabilities described herein.

Figure 3:
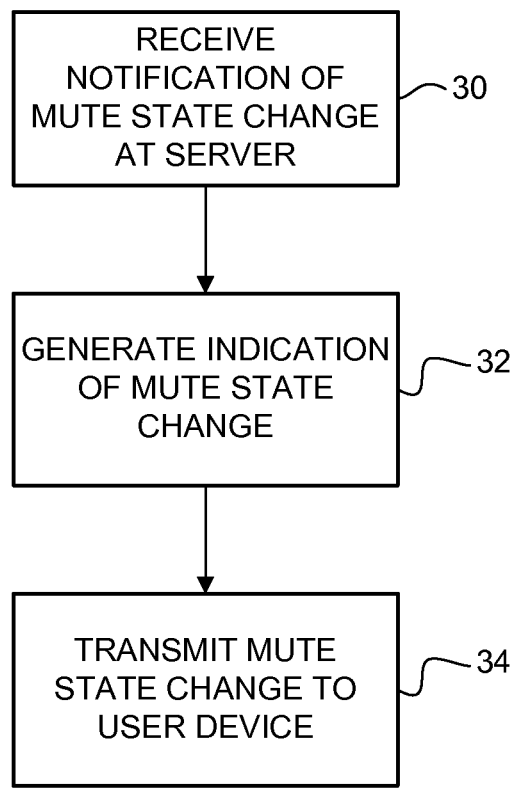
FIG. 3 is a flowchart illustrating an overview of a process for providing notification of mute state between dissimilar endpoint devices.

FIG. 3 is a flowchart illustrating an overview of a process for mute notification between endpoint devices, in accordance with one embodiment. At step 30, notification of a mute state change at a first user device is received at a meeting server 16 in communication with a plurality of user devices in a conference (FIGS. 1 and 3). The notification indicates a mute state change at one of the endpoint devices associated with a user. The mute notification may be, for example, input received at the meeting server via a web browser at user device 14 (e.g., computer used for web session) or input received via user device 15 (e.g., phone used for audio session). The meeting server 16 generates an indication of the mute state change (e.g., 'mute off' changed to 'mute on' or 'mute on' changed to 'mute off') (step 32) and transmits the mute state change for display at a second user device (step 34).

The server 16 is used in a web session and one of the first and second user devices is used in an audio session of the conference. The other of the first and second user devices may also be used in the web session. For example, the first user device may be a phone, microphone, or other client device used in the audio session and the second user device may be a computer, mobile device, or other client device used in the web session. In this example, the meeting server 16 receives an indication of the mute state change from the phone (or communications manager, video communications server, or other network device interposed between the phone and meeting server) and indicates the mute state change on a web browser displayed on a computer used in the web session (second user device). Thus, both user devices (phone and computer) indicate the same mute state even though the devices operate on different platforms.

In another example, the first user device is a computer comprising a meeting application used in the web session and the second user device is a phone, microphone, or other device used in the audio session. The user mutes their audio via the meeting application at their computer (first user device) using the web browser. In this example, the meeting server 16 identifies the endpoint (second user device) associated with the user's web session ID and broadcasts the change to the user device so that the device can indicate the mute state (e.g., illuminate mute light on the phone).

The mute state change may be initiated by the client using one of the endpoints in the web or audio session, or may be initiated by another user (e.g., moderator, host) at another endpoint.

It is to be understood that the process illustrated in FIG. 3 is only an example and steps may be added or modified, without departing from the scope of the embodiments.

Figure 4:
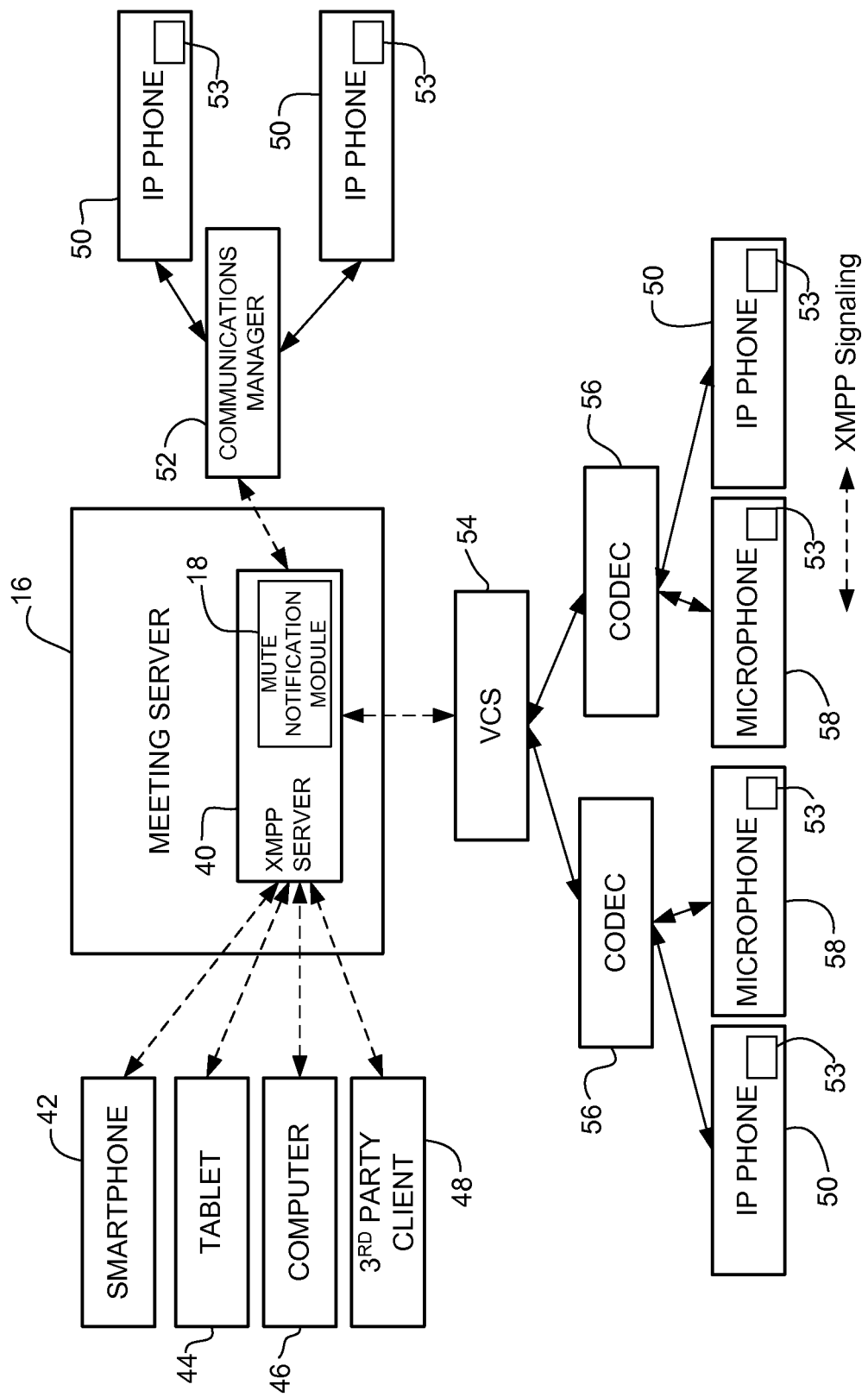
FIG. 4 is a block diagram illustrating interaction between different endpoint devices and a meeting server.

FIG. 4 is a block diagram illustrating examples of communication between different user (endpoint, client) devices and the meeting server 16 of FIG. 1. In this example, the meeting server 16 comprises an XMPP server 40, which includes the mute notification module 18. The endpoints may include one or more smartphone 42, tablet 44, computer 46, or third party client 48. These endpoint devices 42-48 may be used to communicate with the meeting server 16 via a web browser, for example. The endpoints may also include an IP (Internet Protocol) phone 50, which communicates with the meeting server 16 via a communications manager 52 (e.g., Cisco Unified Communications Manager (CUCM)) or a Video Communications Server (VCS) 54. The VCS 54 may operate, for example, at a TelePresence system, which includes one or more codec 56 in communication with any number of IP phones 50 and microphones 58. The phones 50 and microphones 58 each comprise a mute status indicator 53 (e.g., mute status LED (light emitting diode) or screen for displaying text message (e.g., "mute on")). The TelePresence system may also include an LCD (liquid crystal display) for displaying a mute icon or message.

In a first example, the meeting server 16 receives notification of mute state change from the web session and communicates this to the communications manager 52 used in the audio session. In this example, the meeting participant is logged onto the web session via computer 46 and uses his IP phone 50 for the audio session. The IP phone 50 communicates with the meeting server 16 via communications manager 52. The user mutes his audio session via a client application interface at the computer 46. The meeting server 16 mutes the user's audio via the meeting audio bridge. The meeting server 16 (e.g., via XMPP server 40) notifies the communications manager 52 of the mute state change of the user of phone 50. The communications manager 52 includes an application (module, apparatus) operable to receive a mute notification from the XMPP server 40 and transmit a message to the user's phone 50. The message instructs the phone 50 to change its mute indication to on. The phone 50 may, for example, change a mute button LED status from off to pulse. A text message may also be shown on the IP phone's screen stating "Line Muted", for example. The user's line remains muted until the user deselects the mute icon adjacent to their user ID in the meeting application at their computer 46 or turns off the mute (e.g., presses mute button) on their IP phone 50, which initiates a signal back to the communications manager 52, which then communicates the mute state change to the meeting server 16 that the user wants to unmute their audio connection.

In a second example, a mute state change at the IP phone 50 is communicated from the communications manager 52 to the meeting server 16 for update of the web session at the user device. In this example, the user initiates a mute at his IP phone 50 (e.g., via mute button). The mute state is shown on the phone by a red illuminated LED, for example. The mute state change is identified by the communications manager 52, which then notifies the meeting server 16. For example, a client at the communications manager 52 may transmit an XMPP formatted message to the XMPP server 40 indicating that the user's local phone 50 has been manually muted. The mute state change at devices connected to the client ID is communicated from the XMPP server 40 to the meeting server 16. The meeting server 16 indicates the mute state change via the client application (e.g., red X adjacent to the user's ID in the meeting application displayed on the web browser at the computer 46 and to other meeting participants).

In a third example, the user initiates a mute state change at the meeting application using his phone 50. For example, the user may enter a string (e.g., *6) at the phone keypad, which indicates to the meeting application that the user wants to mute his audio. The meeting server 16 responds to this request by muting the audio bridge and displaying a red X adjacent to the user's ID in the meeting application. The meeting server 16 also communicates this mute state change back to the user's phone 50 via the communications manager 52. The communications manager 52 transmits a message to the phone 50 to illuminate its mute light 53. If the client enters the mute state change string again at the phone keypad, the process repeats itself, but this time the mute light is turned off at the user's phone 50.

In a fourth example, the meeting server 16 communicates a mute notification received from a client device used in the web session to the video communications server 54. In this example, the user initiates a mute state change at the computer 46 using the meeting application. The meeting server 16 indicates the mute state change with a red X adjacent to the user's ID in the meeting application. The meeting server 16 also notifies the VCS 54 of the mute state change. For example, the XMPP server 40 may transmit a message to a client at the VCS 54. When a mute notification is received at the VCS 54, the VCS transmits a message to the codec 56. The message includes a directive to change the mute button LED status from off to pulse at the phone 50 and microphone 58 connected to the codec. A text message may also be shown on the IP phone's screen stating "Line Muted", for example. The LCD panel connected to the codec preferably also pulses the mute icon on the LCD screen. The user's line remains muted until he deselects the mute icon adjacent to his user ID in the meeting application or presses the mute button on his phone 50 or microphone 58, which initiates a signal back by the codec 56 to the VCS 54, which then communicates to the meeting server 16 (e.g., via the XMPPP server 40) that the conference room wants to un-mute their audio connection.

In a fifth example, the VCS 54 transmits a mute state change notification to the meeting server 16. In this example, a conference room mutes their IP phone 50 or microphone 58 (e.g., indicated by a red illuminated LED or display of a mute icon on the LCD screen). The codec 56 identifies the mute state change and communicates it to the VCS 54. The client at the VCS 54 notifies the meeting server 16 (e.g., via XMPP formatted message to XMPP server 40) that the client's local codec has been manually muted. The client ID associated with the connecting codec then shows a mute state change via a red X adjacent to the user's ID in the meeting application.

In a sixth example, a communications application such as Jabber is used at the smartphone 42, tablet 44, computer 46, or other device. In this example, the endpoint comprises both the meeting application used in the web session and a communications application used in the audio session. For example, the device may utilize an installed Jabber client to facilitate proper communications with the meeting server 16 and include a client application that supports XMPP. When the user mutes their session via the installed client application, the mute notification is received from the XMPP server 40, muting the user's audio session. The muted audio state is visible within the meeting application installed at the client's device.

For cloud computing, a unified meeting system (e.g., Cisco Unified Meeting Place system) may connect with the cloud through a telephony service provider (TSP) link. The link allows for in-meeting controls such as the ability to mute attendees or see active speakers. The same link may be used to communicate mute state data from the cloud to the communications manager 52 or cluster. The TSP link may be established, for example, by a meeting director outbound to the cloud via a TLS (Transport Layer Security) encrypted dedicated socket connection on the appropriate TCP (Transmission Control Protocol) port to the customer meeting site. The secure session may be used to carry mute state information to prevent malicious attacks of audio state manipulation.

It is to be understood that the endpoint and communication devices shown in FIG. 4 and the use cases described above are only examples, and that different devices and applications may be used, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving at a server in communication with a plurality of remote endpoints in a conference comprising a web session and an audio session, a notification of a mute state change at a first user device at one of said endpoints; and
    generating an indication of the mute state change for a second user device at said endpoint so that both said first and second user devices indicate the same mute state, wherein generating the indication of the mute state change comprises identifying said first user device associated with the mute state change and transmitting a message to change a mute state at said second user device;
    wherein said first user device is used in said web session and said second user device is used in said audio session and not in said web session, each of said user devices utilizing different operating platforms for participating in the conference, and wherein each of said first and second user devices are associated with a same user and client identifier.

2. The method of claim 1 wherein transmitting said message comprises transmitting said message to a communications manager in communication with said second user device.

3. The method of claim 1 wherein transmitting said message comprises transmitting said message to a video communications server in communication with said second user device.

4. The method of claim 1 wherein receiving said notification of the mute state change comprises receiving said notification from a meeting application installed at said first user device.

5. The method of claim 1 wherein said second user device comprises a phone comprising a visual indicator of the mute state.

6. The method of claim 1 wherein receiving said notification of the mute state change comprises receiving said notification from a communications manager in communication with said first user device.

7. The method of claim 1 wherein receiving said notification of the mute state change comprises receiving said notification from a video communications server in communication with said first user device.

8. The method of claim 1 wherein one of said first and second user devices comprises a communications application installed on a mobile device and said other of said first and second user devices comprises a meeting application installed on the mobile device.

9. The method of claim 1 wherein said first user device provides said notification in said web session and operates as said second user device in said audio session.

10. The method of claim 1 wherein the mute state change is displayed at said first and second user devices.

11. The method of claim 1 wherein said mute state change comprises muting audio for said audio session and further comprising muting audio received from said first and second user devices.

12. An apparatus comprising:
    a processor operable to communicate with a plurality of remote endpoints in a conference comprising a web session and an audio session, receive a notification of a mute state change at a first user device at one of said endpoints, and generate an indication of the mute state change for a second user device at said endpoint so that both said first and second user devices indicate the same mute state; and
    memory for storing a mute state;
    wherein generating the indication of the mute state change comprises identifying said first user device associated with the mute state change and transmitting a message to change a mute state at said second user device; and
    wherein said first user device is used in said web session and said second user device is used in said audio session and not in said web session, each of said user devices utilizing different operating platforms for participating in the conference, and wherein each of said first and second user devices are associated with a same user and client identifier.

13. The apparatus of claim 12 wherein said notification is received from a meeting application installed at said first user device.

14. The apparatus of claim 12 wherein said second user device comprises a phone comprising a visual indicator for a mute state.

15. The apparatus of claim 12 wherein one of said first and second user devices comprises a communications application installed on a mobile device and said other of said first and second user devices comprises a meeting application installed on the mobile device.

16. Logic encoded on one or more non-transitory computer readable media for execution and when executed operable to:
    receive at a server in communication with a plurality of endpoints in a conference comprising a web session and an audio session, a notification of a mute state change at a first user device at one of said endpoints; and generate an indication of the mute state change for a second user device at said endpoint so that both said first and second user devices indicate the same mute state, wherein generating the indication of the mute state change comprises identifying said first user device associated with the mute state change and transmitting a message to change a mute state at said second user device;

wherein said first user device is used in said web session and said second user device is used in said audio session and not in said web session, each of said user devices utilizing different operating platforms for participating in the conference, and wherein each of said first and second user devices are associated with a same user and client identifier.

\* \* \* \* \*